United States Patent
Armstrong et al.

(10) Patent No.: US 9,665,314 B2
(45) Date of Patent: May 30, 2017

(54) METHODS AND SYSTEMS FOR MANAGING A PRINT-SETTING USER INTERFACE

(71) Applicant: CANON KABUSHIKI KAISHA, Tokyo (JP)

(72) Inventors: Charles Thomas Armstrong, Rancho Santa Margarita, CA (US); Chihsin Steven Young, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/244,265

(22) Filed: Apr. 3, 2014

(65) Prior Publication Data

US 2015/0286451 A1 Oct. 8, 2015

(51) Int. Cl.
  *G06F 3/12* (2006.01)
  *G06F 3/0488* (2013.01)

(52) U.S. Cl.
  CPC .......... *G06F 3/1205* (2013.01); *G06F 3/0488* (2013.01); *G06F 3/1253* (2013.01); *G06F 3/1285* (2013.01)

(58) Field of Classification Search
  CPC ..................................................... G06F 3/1254
  USPC ....................................................... 358/1.15
  See application file for complete search history.

(56) References Cited

U.S. PATENT DOCUMENTS

| | | | |
|---|---|---|---|
| 5,687,301 A * | 11/1997 | Stokes ................... | G06F 3/1297 358/1.13 |
| 8,037,493 B2 * | 10/2011 | Migos ................... | H04N 5/4403 725/39 |
| 8,842,312 B2 * | 9/2014 | Lao ....................... | G06F 3/1205 358/1.1 |
| 2002/0038387 A1 * | 3/2002 | Fuiks ................... | G06F 9/44505 719/313 |
| 2006/0221372 A1 | 10/2006 | Onishi et al. | |
| 2008/0304092 A1 * | 12/2008 | Ebuchi ................. | G06F 3/1204 358/1.13 |
| 2008/0320390 A1 * | 12/2008 | Semple ................ | G06F 3/0227 715/700 |
| 2009/0128843 A1 * | 5/2009 | Lao ...................... | G06F 3/1205 358/1.15 |

(Continued)

FOREIGN PATENT DOCUMENTS

| | | |
|---|---|---|
| JP | 2007-328515 A | 12/2007 |
| JP | 2008-234339 A | 10/2008 |

OTHER PUBLICATIONS

"Developing v4 Print Drivers v1.2." Microsoft. May 13, 2012.

(Continued)

*Primary Examiner* — Benjamin O Dulaney
(74) *Attorney, Agent, or Firm* — Canon U.S.A., Inc. IP Division

(57) ABSTRACT

Systems, devices, and methods for managing a print-setting user interface (UI) receive a request to display a print-setting UI of a printer driver from an application, wherein the request includes one or more of an application identification (ID) of the application; obtain a hardware profile data of an application-host device, wherein the application-host device has the application installed thereon; and obtain one or more sets of print-setting UI data corresponding to one or more of the application ID and the hardware profile data; and display a print-setting UI based on the one or more sets of print-setting UI data obtained.

15 Claims, 13 Drawing Sheets

(56) References Cited

U.S. PATENT DOCUMENTS

| | | | |
|---|---|---|---|
| 2010/0100832 A1* | 4/2010 | Wang | G06F 17/30905 |
| | | | 715/764 |
| 2011/0134466 A1 | 6/2011 | Nakagawa | |
| 2011/0162035 A1* | 6/2011 | King | G06F 1/1632 |
| | | | 726/1 |
| 2012/0117497 A1* | 5/2012 | Uola | G06F 9/4443 |
| | | | 715/762 |
| 2012/0120443 A1 | 5/2012 | Aritomi | |
| 2012/0226985 A1* | 9/2012 | Chervets | G06F 9/4445 |
| | | | 715/735 |
| 2013/0080662 A1* | 3/2013 | Bourque | G09G 5/006 |
| | | | 710/10 |
| 2013/0169981 A1* | 7/2013 | Takahashi | G06F 3/1205 |
| | | | 358/1.9 |
| 2013/0191779 A1* | 7/2013 | Radakovitz | G06F 3/0488 |
| | | | 715/800 |
| 2015/0095767 A1* | 4/2015 | Ebner | G06F 17/30905 |
| | | | 715/238 |

OTHER PUBLICATIONS

"Xerox Print Driver Platform." Fuji Xerox. Dec. 18, 2012.
"Simplifying printing in Windows 8" Building Windows 8. Jan. 16, 2013. <blogs.msdn.com/b/b8/archive/2012/07/25/simplifying-printing-in-windows-8.aspx>.
"Printer Resource Toolkit." Black Ice. Jan. 22, 2013. <blackice.com/Printer%20Drivers%20Resource%20Tool%20Kit.htm#1>.

* cited by examiner

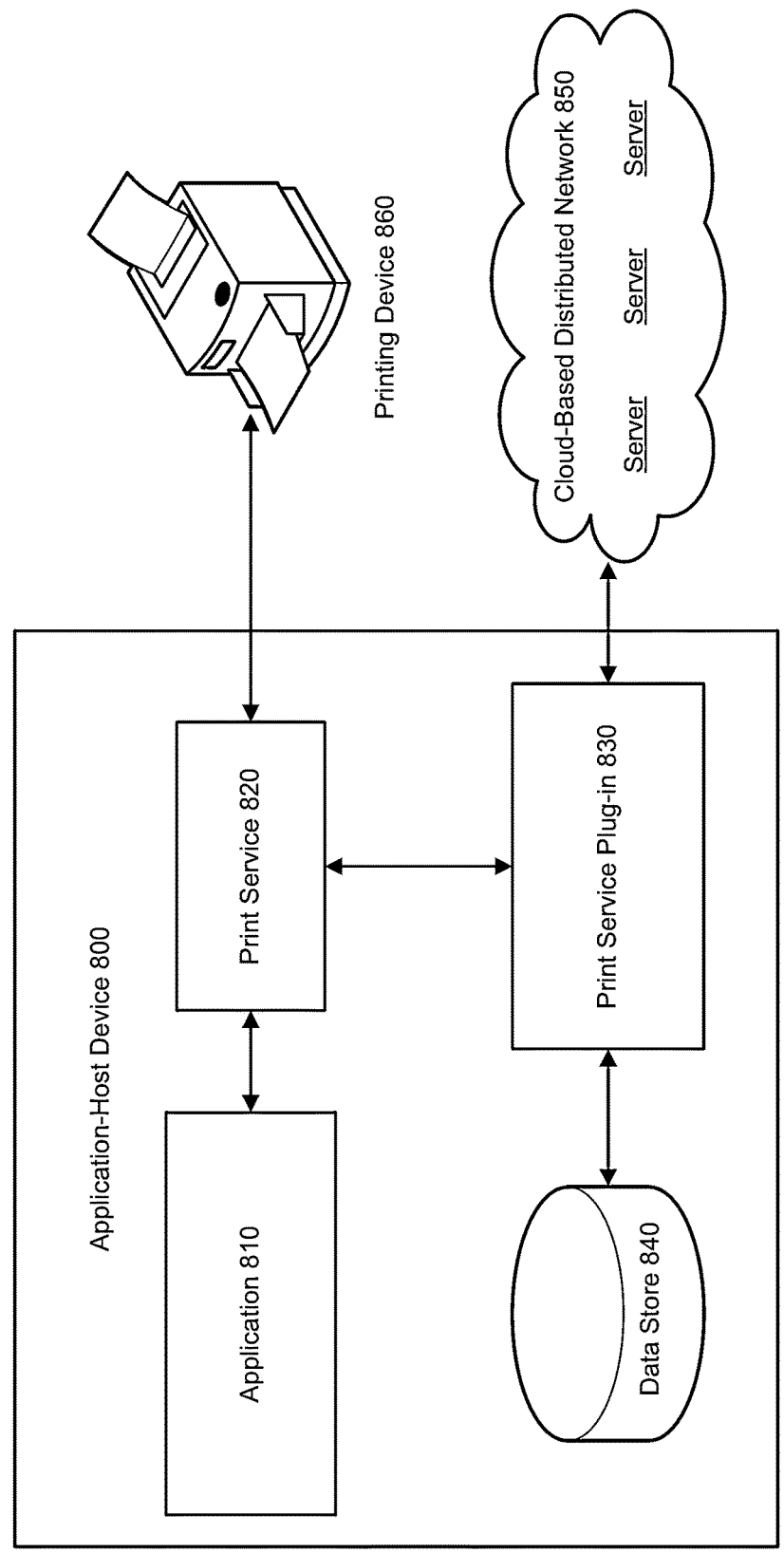

METHODS AND SYSTEMS FOR MANAGING A PRINT-SETTING USER INTERFACE

BACKGROUND

Field of the Disclosure

The present disclosure relates generally to methods and systems for managing a print-setting user interface.

Description of the Related Art

Microsoft produces an operating system that provides a printer driver that includes a printer extension. The printer extension allows a printer-extension application to a print-setting user interface (UI) for the printer driver. However, according to the architecture of the printer driver, only one printer-extension application is allowed to be registered with the printer-driver identification (ID). In other words, the print-setting UI provided by the printer-extension application of a specific printer driver is the same across all applications and devices.

For example, the print-setting UI for a document-viewer application (e.g., Microsoft Word), which often does not involve many color adjustments, is the same as for a photo-printing application (e.g., Adobe® Photoshop®), which may involve many color adjustments to enhance the appearance of an image to be printed. Thus, the user may need to discover and adjust the print settings accordingly.

Additionally, the print-setting UI would appear the same irrespective of the client device's capabilities, such as screen size and available input devices. For example, the print-setting UI for a desktop computing device will be the same as that for a portable computing device (e.g., tablet or smartphone), which is generally provided with a smaller display than a desktop computing device. However, viewing the same print-setting UI as the desktop computing device on a small display of a portable computing device is difficult and inconvenient for the user, for example when checking print preferences. Further, for example, when print preferences are set via the print-setting UI on a desktop computing device, a mouse may be used as an input device for setting print preferences. The user scrolls up and down by clicking on the scroll bar and by clicking on the options to set the print preferences. However, when setting print preferences via the print-setting UI of a desktop computing device on a mobile computing device with a touch-screen input capability, it may be difficult for a user to manipulate the scroll bar via a touchscreen. Therefore, it may result in a poor printing experience for the user.

SUMMARY

In one embodiment, a method for managing a print-setting user interface (UI) comprises receiving a request to display a print-setting UI of a printer driver from an application, wherein the request includes one or more of an application identification (ID); obtaining a hardware profile data of an application-host device, wherein the application-host device has the application installed thereon; obtaining print-setting UI data corresponding to one or more of the application ID and the hardware profile data; and displaying a print-setting UI based on the print-setting UI data obtained.

In one embodiment, a computing device comprises one or more computer-readable media and one or more processors coupled to the computer-readable media and configured to cause the computing device to perform operations including receiving a request to display a print-setting UI of a printer driver from an application, wherein the request includes at least an application ID of the application; obtaining a hardware profile data of the computing device, wherein the computing device has the application installed thereon; obtaining one or more sets of print-setting UI data corresponding to one or more of the application ID and the hardware profile data; and displaying a print-setting UI based on the print-setting UI data obtained.

In one embodiment, one or more computer-readable media storing instructions that, when executed by one or more computing devices, cause the computer devices to perform operations comprising receiving a request to display a print-setting UI of a printer driver from an application, wherein the request includes at least an application ID of the application; obtaining a hardware profile data of an application-host device, wherein the application-host device has the application installed thereon; obtaining one or more sets of print-setting UI data corresponding to one or more of the application ID and the hardware profile data; and displaying a print-setting UI based on the print-setting UI data obtained.

BRIEF DESCRIPTION OF THE DRAWINGS

FIG. 8 is a block diagram illustrating example embodiment of a system for managing a print-setting UI.

DETAILED DESCRIPTION

The following description is of certain illustrative embodiments, although other embodiments may include alternatives, equivalents, and modifications. Additionally, the illustrative embodiments may include several novel features, and a particular feature may not be essential to practice the systems and methods described herein.

Figure 1:
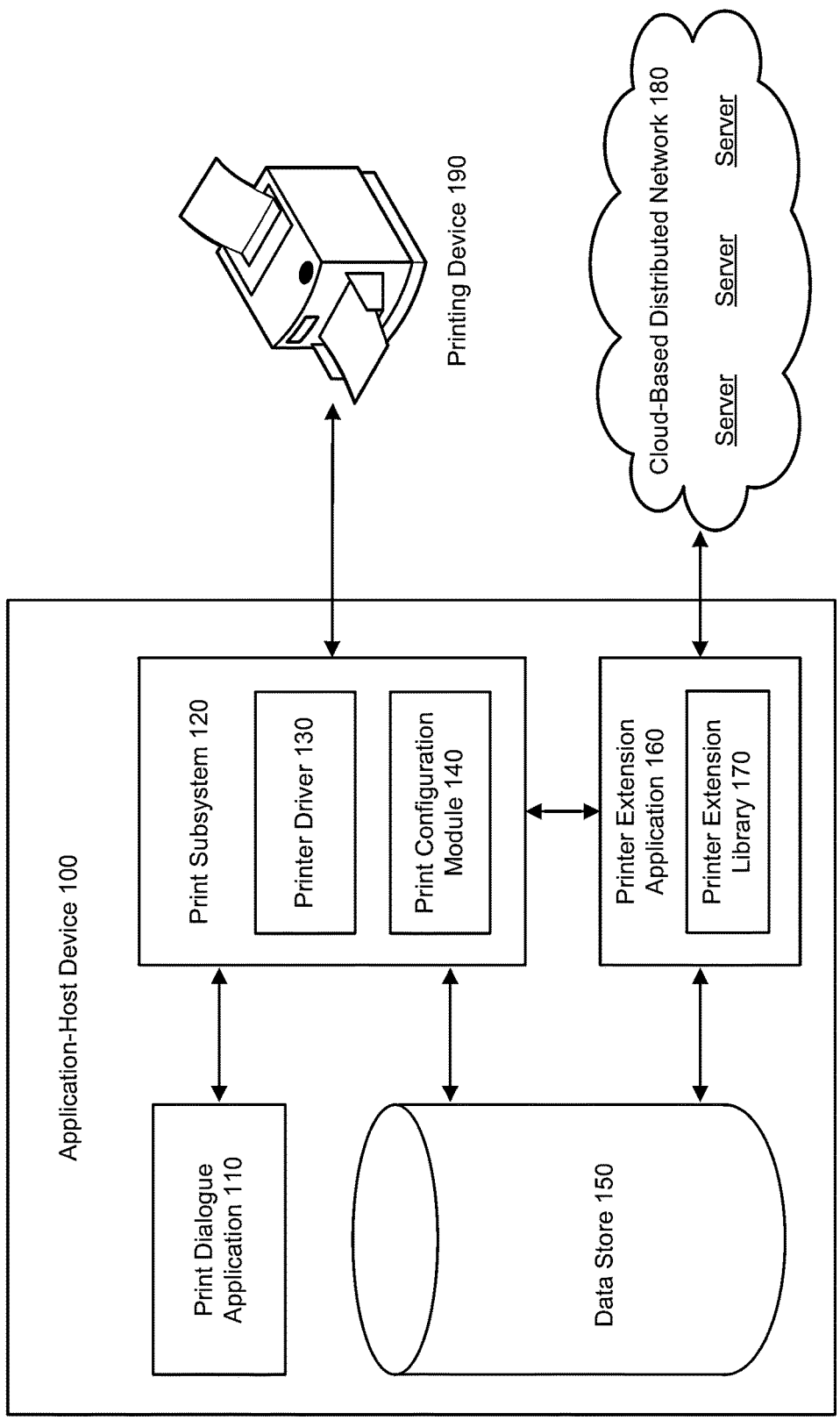
FIG. 1 is a block diagram illustrating an example embodiment of a system for managing a print-setting UI.

FIG. 1 is a block diagram illustrating an example embodiment of a system for managing a print-setting UI. The system for managing a print-setting UI includes an application-host device 100, a cloud-based distributed network 180, and a printing device 190.

The application-host device 100 may be any computing device (e.g., a desktop computer, laptop computer, server, mobile phone, personal digital assistant, tablet) that is capable of communicating via a network. The application-host device 100 may include at least one display that is capable of rendering images. The application-host device 100 further includes one or more processors (also referred to herein as "CPUs"), which may be a conventional or customized microprocessor(s). The CPUs are configured to read and execute computer-readable instructions, and the CPUs may command and/or control other components of the application-host device 100.

The application-host device 100 also includes I/O interfaces, I/O devices, or both. The I/O interfaces provide communication interfaces to I/O devices, and the I/O devices may include a keyboard, a display device, a mouse, a printing device, a touch screen, a light pen, an optical storage device, a scanner, a microphone, a camera, etc. The application-host device 100 further includes memory, which may be volatile (e.g., RAM), non-volatile (e.g., ROM, flash memory) or a combination of both. The application-host device 100 includes a network interface that allows the application-host device 100 to communicate with the other devices. The application-host device 100 also includes a storage device that includes one or more computer-readable or computer-writable storage media. A computer-readable storage medium, as opposed to mere transitory, propagating signals, is a tangible article of manufacture, for example, a magnetic disk (e.g., a hard drive, a floppy disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The application-host device 100 includes an operating system, which manages the hardware, the processes, the interrupts, the memory, and/or the file system of the application-host device 100. The application-host device 100 further includes a print dialogue application 110, a print subsystem 120, a data store 150, and a printer extension application 160.

The print dialogue application 110 may be any application that prints data, such as a word processing application, a photo editing application, and a web browser. The print dialogue application 110 receives a request to display a print-setting user interface (UI) from the user and relays the request to the print subsystem 120. The request may include the application identification (ID) of the print dialogue application 110, the user ID, or both. The application ID may be the name of the print dialogue application 100, such as word.exe, paint.exe, or notepad.exe. For example, the application ID may also include an application version, an application description, a filename and its extension, or any combination thereof.

The print subsystem 120 interfaces between one or more entities and one or more other entities in the system. For example, the print subsystem 120 is configured to relay data between the print dialogue application 110 and the printer extension application 160 and between the print dialogue application 110 and the printing device 190. Further, the print subsystem 120 may communicate with a printer driver 130 to provide default print settings data. The default print settings data may include data in the form of markup language data, such as a PrintTicket (PT) XML document/object. The print subsystem 120 includes a printer driver 130 and a print configuration module 140.

The printer driver 130 communicates with the printing device 190 regarding the settings, capabilities, and status of the printing device 190. In the disclosed embodiments, the printer driver 130 is the printer driver of the printing device 190. Further, the printer driver 130 may provide additional print settings data specific to the printing device 190. In addition, the printer driver 130 may provide print capabilities data, which may include data in the form of markup language data, for example, a PrintCapabilitites (PC) XML document/object.

The print configuration module 140 is configured to provide a common application programming interface (API) between the print subsystem 110 and the printer extension application 160. The print configuration module 140 may include a set of computer-readable instructions, processes, logics, and any combination of the three that, when executed, invoke the functionality of the printer extension application 160.

The data store 150 is configured to store data received from the printer extension application 160. The data received from the printer extension application 160 may be related to a print-setting UI, such as print-setting UI data that are used to generate a print-setting UI, and may include information, such as print settings data, print capabilities data, and user-selected print options data, and may be associated with an application ID, hardware profile data, and a user ID. In addition, the data store 150 may include a registry to which the printer extension application 160 is registered.

The printer extension application 160 is configured to receive data, perform the requested operations, and return the data. For example, the printer extension application 160 receives the user ID, the application ID, or both from the print subsystem 120. Then, the printer extension application 160 obtains print-setting UI data associated with the user ID, the application ID, the hardware profile data, or any combination of the three from the data store 150 or one or more of the servers on the cloud-based distributed network 180.

The printer extension application 160 generates a print-setting UI based on the obtained print-setting UI data. The printer extension application 160 may present information to the user, may receive information from the user, or may do both via the print-setting UI displayed on the application-host device 100 (e.g., via the I/O interface of the application-host device 100). The information may also be presented in any other manner that allows the user to view the information, select one or more options, or both. In addition, the printer extension application 160 sends the information received from the user via the print-setting UI to the data store. The print-setting UI data obtained from the data store may be replaced or merged with the latest print-setting UI data. Further, the printer extension application 160 returns the user-selected print-settings data to the print subsystem 120. The printer extension application 160 may further obtain hardware profile data that include the capabilities of the application-host device 100, such as screen size, screen type, screen resolution, text size, input capabilities, output capabilities, etc. The hardware profile data may further indicate the type of device, such as a desktop, a laptop, a tablet, or a smartphone.

The printer extension library 170 creates and provides a set of interfaces for accessibility. For example, when the print configuration module 140 launches the printer extension application 160, the printer extension library 170 creates a set of interfaces for accessing PrintTicket, PrintCapabilities, or both and provides the set of interfaces to the printer extension application 160 and the print subsystem 120.

The cloud-based distributed network 180 includes one or more servers that may store and/or provide data, other information, or both. For example, the servers in the cloud-based distributed network 180 may include independent hardware vendor (IHV) servers or independent software vendor (ISV) servers. Also, a web interface allows a user to create and customize a user experience specific to a print dialogue application and application-host device 100 capabilities. The print-setting UI that provides the specific user experience is stored in the IHV or ISV servers.

The printing device 190 is configured to receive print data and print the print data on one or more print media (e.g., paper, cardboard, plastic, fabric) based on the received data. The printing device 190 may print the data onto the print media according to one or more user-selected settings.

Figure 2:
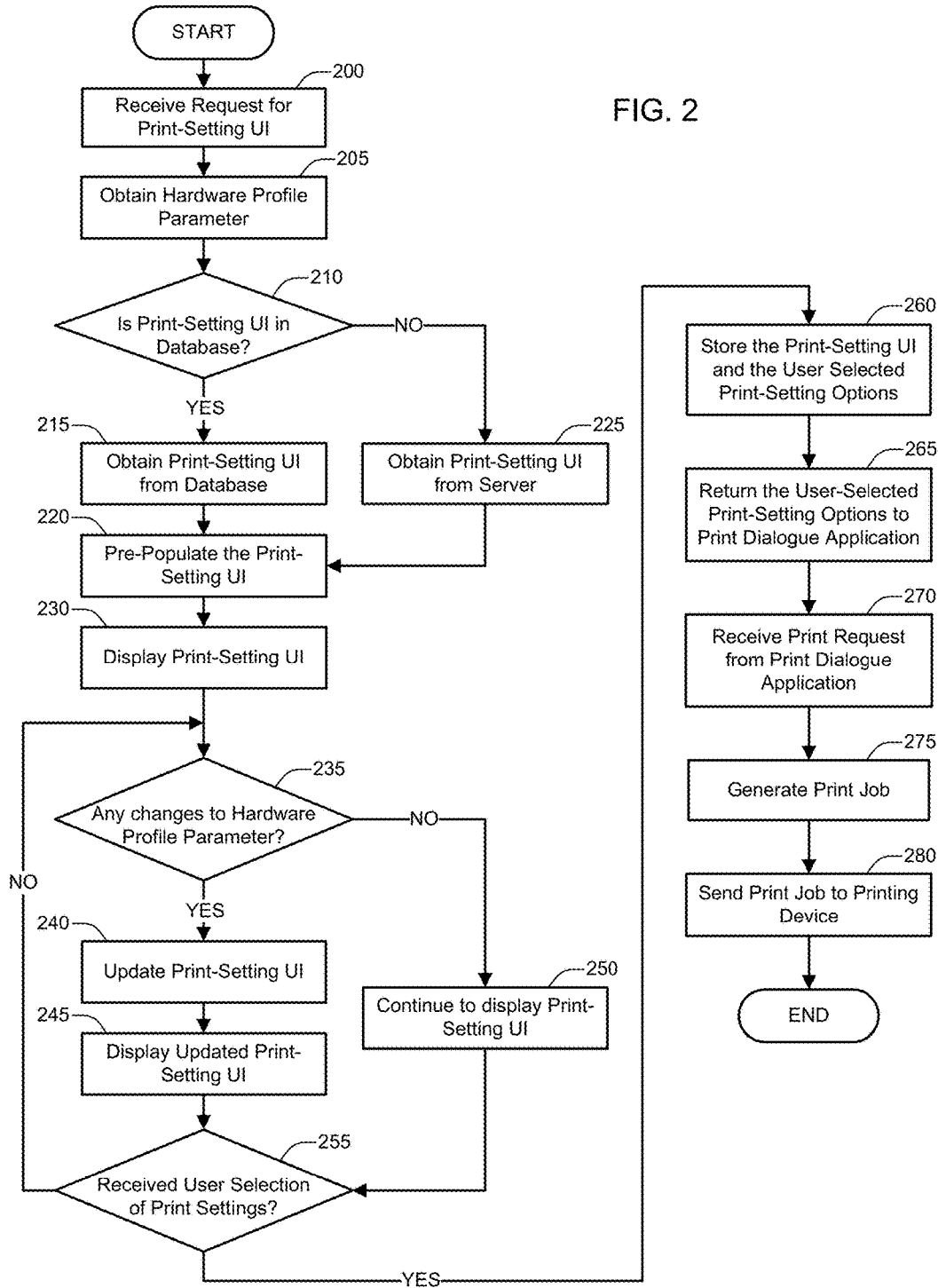
FIG. 2 is a flowchart illustrating an example embodiment of a method for managing a print-setting UI.

FIG. 2 is a flowchart illustrating an example embodiment of a method for managing a print-setting UI. The blocks of this method and the other methods described herein may be performed by one or more computing devices, for example the systems and devices described herein. Also, although this method and the other methods described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this method and the other methods described herein may omit blocks, add blocks, change the order of the blocks, combine blocks, or divide blocks into more blocks.

Beginning in block 200, a printer extension application (e.g., the printer extension application 160 in FIG. 1) receives a request to display a print-setting UI of a printer driver from a print dialogue application (e.g., the print dialogue application 110 in FIG. 1) via a print subsystem (e.g., the print subsystem 120 in FIG. 1), wherein the printer driver is the printer driver of a target printing device. The request may be sent from the print dialogue application in response to a user command (e.g., opening an advanced print setting window or opening a print preference window). For example, the request may be sent from the print dialogue application to the print subsystem when the user clicks on a print-preference button or an advanced-print-setting button to open a print-setting UI. Then, the print subsystem relays the request to the printer extension application. The request sent from the application may include at least the print dialogue application ID, user ID, or both.

In block 205, the printer extension application obtains hardware profile data of the application-host device. Next, in block 210, the printer extension application determines whether a print-setting UI that is associated to the user ID, the print dialogue application ID, the hardware profile data, or any combination of the three is stored in a data store (e.g., the data store 150 in FIG. 1). If the print-setting UI is stored in the data store (block 210=YES), then the flow proceeds to block 215. Otherwise, if the print-setting UI is not stored in the data store (block 210=NO), then the flow proceeds to block 225.

In block 215, the printer extension application obtains the print-setting UI from the data store. In block 225, the printer extension application obtains the print-setting UI from one or more servers in a cloud-based distributed network (e.g., the cloud-based distributed network 180 of FIG. 1). After block 215 or block 225, in block 220 the printer extension application pre-populates the print-setting UI obtained. The printer extension application may pre-populate the print-setting UI according to a default PrintTicket from the print subsystem. In some embodiments, the print-setting UI may be pre-populated according to print settings data stored in the data store. In block 230, the printer extension application displays the pre-populated print-setting UI on the application-host device (e.g., via the I/O device of the application-host device).

In block 235, while displaying the print-setting UI, the printer extension application checks whether any changes to the capabilities of the application-host device have been detected, as indicated by the hardware profile parameter of the application-host device. A change to the capabilities of the application-host device may occur, for example, when the user removes a 7-inch tablet device (e.g., the application-host device) from a docking station to which a mouse and an 18-inch external display are connected. This will change the capabilities of the application-host device from a mouse-centric to a touch-centric input method and from the 18-inch display to the 7-inch display. If the printer extension application detects one or more changes to the capabilities of the application-host device (block 235=YES), then the flow proceeds to block 240. Otherwise, if the printer extension application does not detect changes to the capabilities of the application-host device (block 235=NO), then the flow proceeds to block 250.

In block 240, the printer extension application updates the print-setting UI according to the one or more changes that were made to the capabilities of the application-host device. For example, the printer extension application may update the print-setting UI by performing the operations of block 210, 215, 220, and 225. Then in block 245, the printer extension application displays the updated print-setting UI. For example, the print-setting UI being displayed may suit an application-host device having a mouse input method (e.g., mouse centric) and an 18-inch external display. However, when the user disconnects the mouse and the 18-inch external display from the application-host device, the printer extension application detects the capabilities changes in the application-host device and displays a print-setting UI that suits an application-host device having a touch input method (e.g., touch-centric) and a 7-inch display.

If the flow moves to block 250, then in block 250, when the printer extension application does not detect changes to the capabilities of the application-host device, the printer extension application continues to display the print-setting UI that is already being displayed.

In block 255, the printer extension application determines whether a user selection of the print settings has been received via the print-setting UI. If the user selection of the print settings has been received (block 255=YES), then the flow proceeds to block 260. Otherwise, if the user selection of the print settings has not been received (block 255=NO), then the flow returns to block 235.

In block 260, the printer extension application stores the print-setting UI data that were used to display the print-setting UI and stores the user-selected print-settings options in the data store. Then in block 265, the printer extension application sends the user-selected print-settings options to the print dialogue application. The user-selected print-settings options may be described in the form of a PrintTicket (e.g., a resulting PrintTicket).

In block 270, the print dialogue application sends a print request, which may include the final user-selected print-settings options and document to be printed, to the print subsystem, and in block 275 the print subsystem generates a print job. Finally, in block 280, the print subsystem sends the print job to the target printing device.

Figure 3:
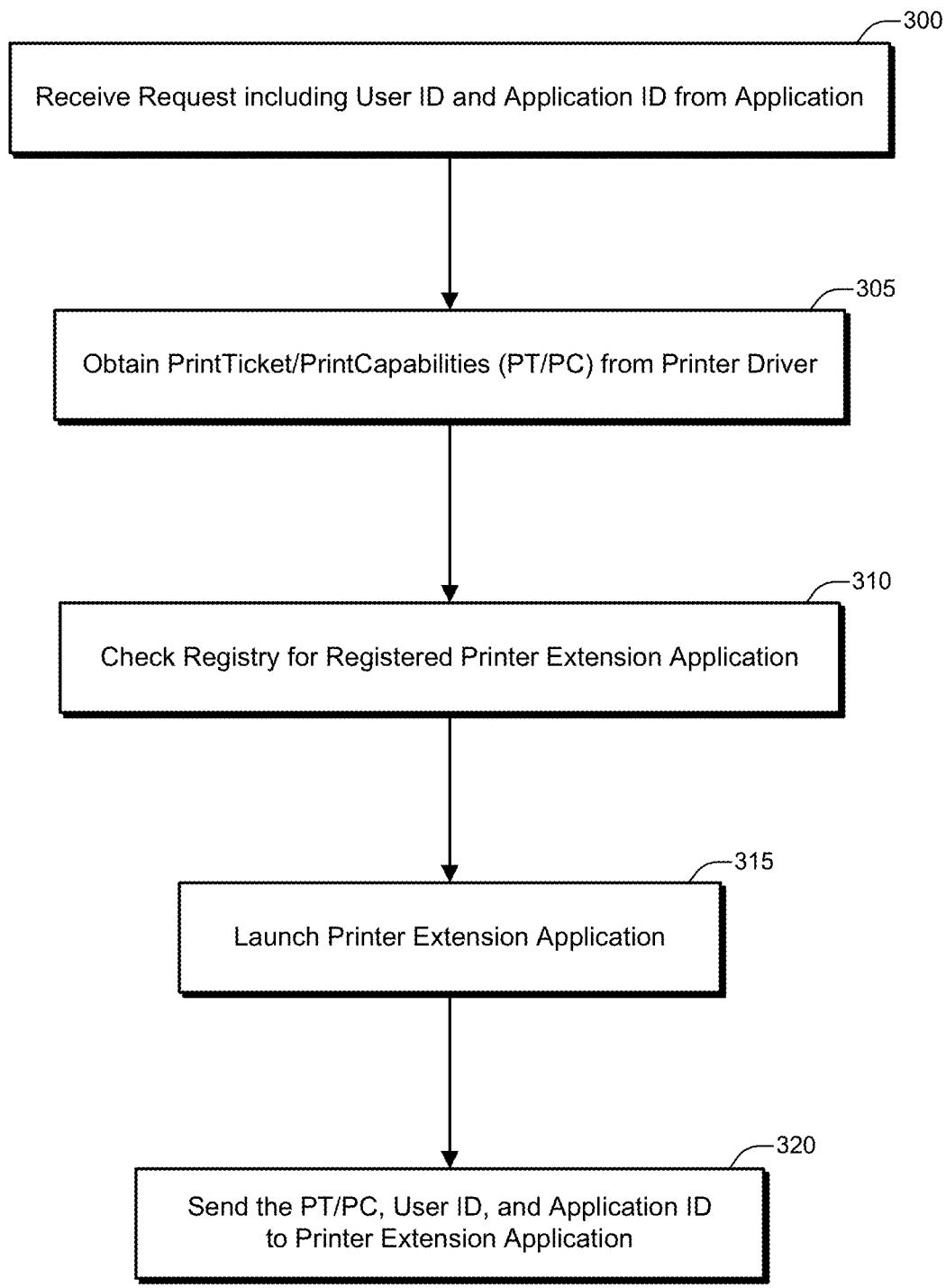
FIG. 3 is a flowchart illustrating an example embodiment of a method for launching a printer extension application.

FIG. 3 is a flowchart illustrating an example embodiment of a method for launching a printer extension application. When a user wishes to print a document to a target printing device via a print dialogue application, the user may click, press, tap, slide, or otherwise active a control (e.g., a button, a check box, a slide bar, an icon) to set print preferences for the document. When the control for setting print preferences is manipulated, the print dialogue application generates a request and includes at least a user ID, an application ID of a print dialogue application, or both into the request. The print dialogue application sends the request to a print subsystem.

Beginning in block 300, the request, including the user ID and the print dialogue application ID, is received at the print subsystem. Then in block 305, the print subsystem obtains a default PrintTicket/PrintCapabilities (PT/PC) from the driver of the target printing device. A default PrintTicket describes a default print settings. The PrintCapabilities provides printing device capabilities for the currently obtained default print ticket.

In block 310, the print subsystem searches a registry for a printer extension application that is registered for the printer driver of the target printing device. In some embodiments, the print subsystem communicates with the registry via a print configuration module in the print subsystem. In addition, the registry may be included in the data store. In block 315, the print subsystem launches the printer extension application according to the search result. Finally, in block 320, the print subsystem sends the default PT/PC, the user ID, and the print dialogue application ID to the printer extension application that was launched in block 315.

Figure 4:
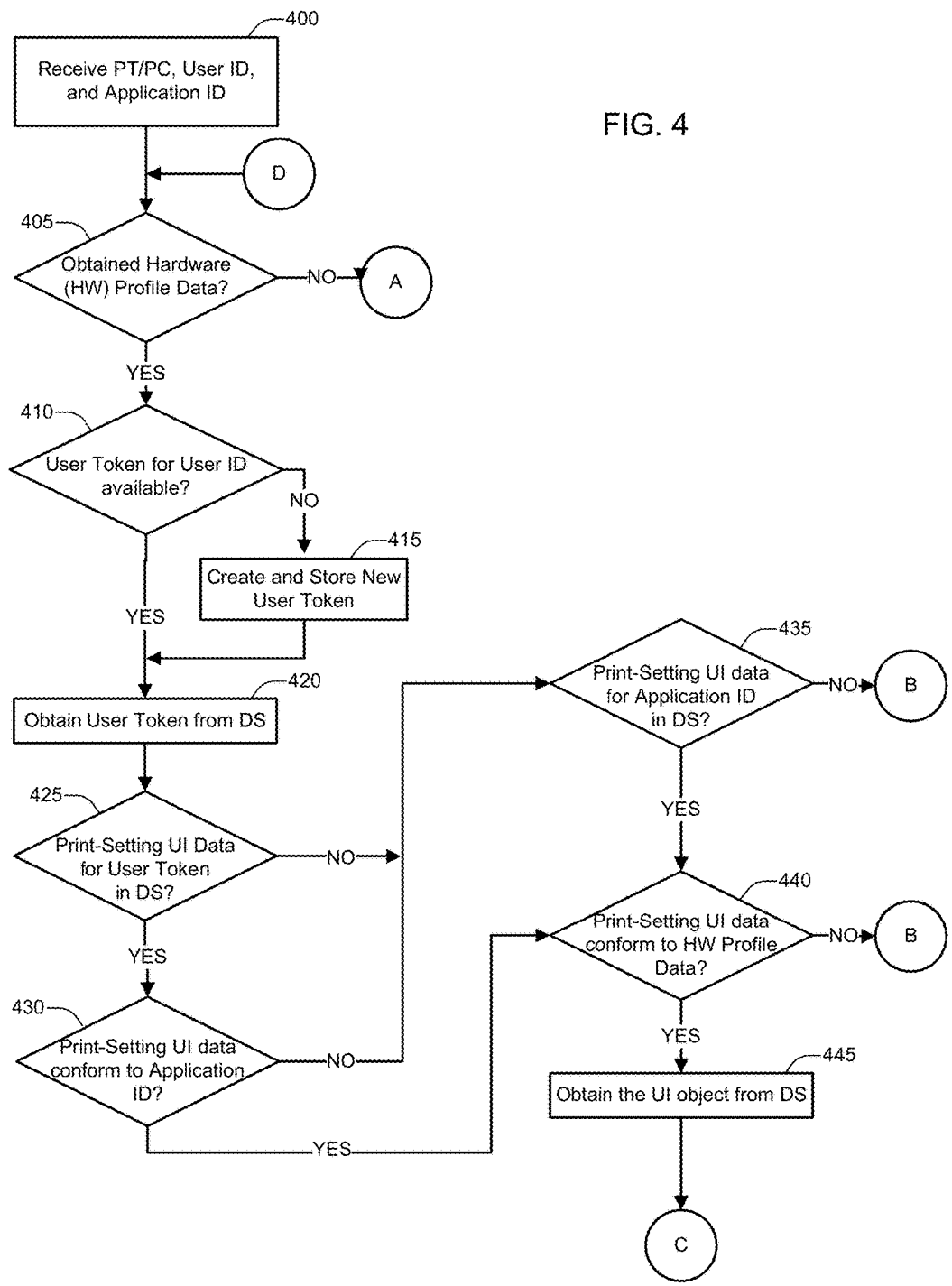
FIG. 4 is a flowchart illustrating an example embodiment of a method for obtaining print-setting UI data.

FIG. 4 is a flowchart illustrating an example embodiment of a method for obtaining print-setting UI data. When a print subsystem receives a request for displaying a print-setting UI from an application, the print subsystem launches a printer extension application that is registered for the printer driver of a target printing device and sends a PT/PC to the printer extension application via a print configuration module. The operations by the printer extension application to obtain print-setting UI data will be described hereinafter.

Beginning in block 400, a PT/PC, a user ID, and an application ID of a print dialogue application are received from the print subsystem. In block 405, whether hardware (HW) profile data of the application-host device has been obtained is determined by the printer extension application. If the hardware profile data for the application-host device have been obtained (block 405=YES), then the flow proceeds to block 410. Otherwise, if the hardware profile data have not been obtained (block 405=NO), then the flow proceeds to "A" in FIG. 5.

In block 410, whether a user token for the received user ID is available from a data store is determined. If the user token for the user ID is stored in and available from the data store (block 410=YES), then the flow proceeds to block 420. Otherwise, if the user token for the user ID is neither stored in nor available from the data store (block 410=NO), then the flow proceeds to block 415. In block 415, a new user token for the user ID is created and stored in the data store.

Then, in block 420, the user token is obtained from the data store (DS). In block 425, whether print-setting UI data for the user token are stored in the data store is determined. In other words, whether print-setting UI data that are associated with the user token is stored in the data store is determined. If the print-setting UI data for the user token are stored in the data store (block 425=YES), then the flow proceeds to block 430. Otherwise, if the print-setting UI data for the user token are not stored in the data store (block 425=NO), then the flow proceeds to block 435.

In block 430, whether the print-setting UI data for the user token conform to the application ID is determined. For example, whether the application ID of any of the print-setting UI data that are associated with the user token conforms to the application ID received from the print subsystem is determined. If the print-setting UI data match the application ID (block 430=YES), then the flow proceeds to block 440. Otherwise, if the print-setting UI data do not conform to the application ID (block 430=NO), the flow proceeds to block 435.

In block 435, whether print-setting UI data for the application ID are stored in the data store is determined. For example, whether the application ID of print-setting UI data that are stored in the data store conforms to the application ID received from the print subsystem is determined. If print-setting UI data for the application ID are stored in the data store (block 435=YES), then the flow proceeds to block 440. Otherwise, if print-setting UI data for the application ID are not stored in the data store (block 435=NO), then the flow proceeds to "B" in FIG. 6.

In block 440, whether print-setting UI data conform to the hardware profile data is determined. For example, whether the print-setting UI data, which are associated with the user token and conform to the application ID received from the print subsystem, also conform to the hardware profile data of the application-host device is determined. If the print-setting UI data conform to the hardware profile data (block 440=YES), then the flow proceeds to block 445. Otherwise, if the print-setting UI data do not conform to the hardware profile data (block 440=NO), then the flow proceeds to "B" in FIG. 6.

Finally, in block 445, the print-setting UI data are obtained from the data store. Then the flow further proceeds to "C" in FIG. 7.

Figure 5:
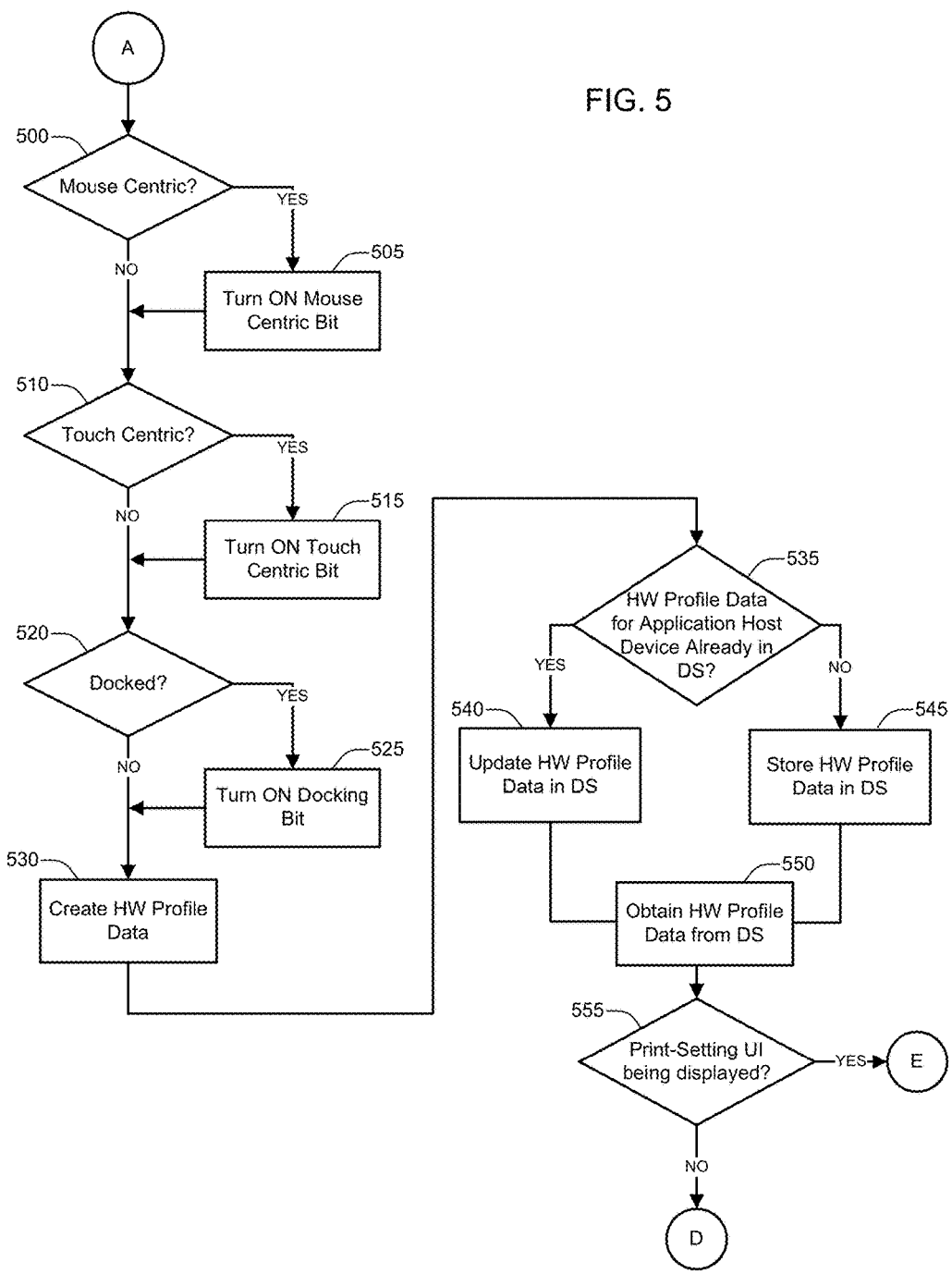
FIG. 5 is a flowchart illustrating an example embodiment of a method for obtaining hardware profile data.

FIG. 5 is a flowchart illustrating an example embodiment of a method for obtaining hardware profile data. When the printer extension application determines that the hardware profile data for the application-host device that is hosting the print dialogue application have not been obtained, the printer extension application obtains the hardware profile data. The operations of obtaining the hardware profile data are performed at the printer extension application.

Beginning in block 500, whether the application-host device is a mouse-centric device is determined. For example, if the application-host device is a desktop computer that uses a mouse as the input method, then the application-host device is considered to be a mouse-centric device. Yet in some embodiments, the application-host device may be a tablet device with a touchscreen that is attached to a docking station to which a mouse is connected, and the mouse is the main input method for the application-host device. In such a case, the application-host device may be considered to be a mouse-centric device as well. If the application-host device is a mouse-centric device (block 500=YES), then the flow proceeds to block 505, in which the bit for mouse centric is turned "ON". Otherwise, if the application-host device is not a mouse-centric device (block 500=NO), then the flow proceeds to block 510.

In block 510, whether the application-host device is a touch-centric device is determined. The application-host device may be considered a touch-centric device if the application-host device is a tablet device with touchscreen and no other input device (e.g., mouse, keyboard) is connected directly or indirectly to the tablet device. If the application-host device is a touch-centric device (block 510=YES), then the flow proceeds to block 515 where the bit for touch centric is turned "ON". Otherwise, if the application-host device is not a touch-centric device (block 510=NO), then the flow proceeds to block 520.

In block 520, whether the application-host device is docked to a docking station is determined. If the application-host device is docked to a docking station (block 520=YES), then the flow proceeds to block 525 in which the bit for docking is turned "ON". Otherwise, if the application-host device is not docked (block 520=NO), then the flow proceeds to block 530.

The printer extension application may determine other configurations of the application-host device, such as the screen size, the resolution, and other input or output methods.

Then, in block 530, current hardware profile data are created according to the determined configurations of the application-host device. In block 535, whether the hardware profile data of the application-host device are already stored in the data store is determined. If the hardware profile data are already stored in the data store (block 535=YES), then the flow proceeds to block 540. Otherwise, if the hardware profile data are not yet stored in the data store (block 535=NO), then the flow proceeds to block 545.

In block 540, the hardware profile data that are already stored in the data store are updated with the current hardware profile data that were created in block 530. In block 545, the current hardware profile data that were created in block 530 are stored in the data store. Then, after block 540 or block 545, in block 550 the current hardware profile data are obtained from the data store. Finally, in block 555, whether the printer extension application is displaying the print-setting UI is determined. If the print-setting UI is not being displayed (block 555=NO), then the flow proceeds to "D" in FIG. 4. Otherwise, if the print-setting UI is being displayed (block 555=YES), the flow proceeds to "E" in FIG. 7.

Figure 6:
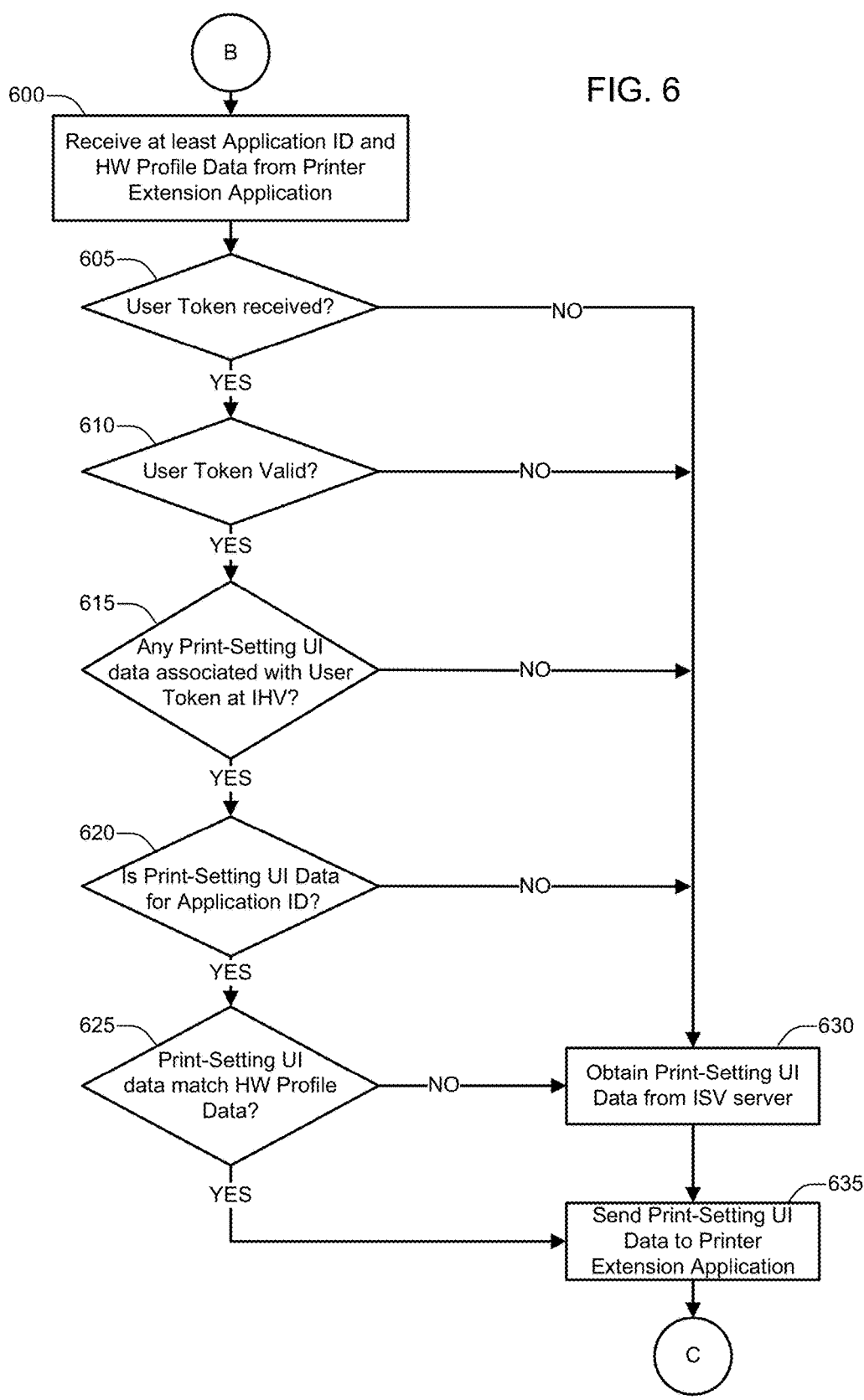
FIG. 6 is a flowchart illustrating an example embodiment of a method for obtaining print-setting UI data.

FIG. 6 is a flowchart illustrating an example embodiment of a method for obtaining print-setting UI data. When the printer extension application determines that the print-setting UI data for the application ID of the print dialogue application, the hardware profile data, or both are not stored in the data store, then the printer extension communicates with and sends the user token, the application ID, and the hardware profile data to an independent hardware vendor (IHV) server in a cloud-based distributed network to obtain the print-setting UI data.

Beginning in block 600, the IHV server receives the application ID and the hardware profile data from the printer extension application. In some embodiments, the IHV server receives the user token along with the application ID and the hardware profile data. In block 605, the IHV determines whether a user token has been received from the printer extension application. If the user token has been received (block 605=YES), then the flow proceeds to block 610. Otherwise, if the user token has not been received (block 605=NO), then the flow proceeds to block 630.

In block 610, the IHV server determines whether the user token received from the printer extension application is valid. If the received user token is valid (block 610=YES), then the flow proceeds to block 615. Otherwise, if the received user token is not valid (block 610=NO), then the flow proceeds to block 630.

In block 615, the IHV server determines whether the print-setting UI data that are associated with the user token is available (e.g., stored) at the IHV server. If the print-setting UI data that are associated with the user token is available at the IHV server (block 615=YES), then the flow proceeds to block 620. Otherwise, if the print-setting UI data that are associated with the user token is not available at the IHV server (block 615=NO), then the flow proceeds to block 630.

In block 620, the IHV server determines whether the print-setting UI data associated with the user token is for the application ID that is received. If the print-setting UI data associated with the user token is for the application ID (block 620=YES), then the flow proceeds to block 625. Otherwise, if the print-setting UI data associated with the user token is not for the application ID (block 620=NO), then the flow proceeds to block 630.

In block 625, the IHV server determines whether the print-setting UI data match the hardware profile data. If the print-setting UI data matches the hardware profile data (block 625=YES), then the flow proceeds to block 635. Otherwise, if the print-setting UI data do not match the hardware profile data (block 625=NO), then the flow proceeds to block 630.

In block 630, the IHV server obtains the print-setting UI data from an independent software vendor (ISV) server in the cloud-based distributed network. Finally, in block 635, the IHV server sends the print-setting UI data to the printer extension application. Then the flow proceeds to "C" in FIG. 7.

Figure 7:
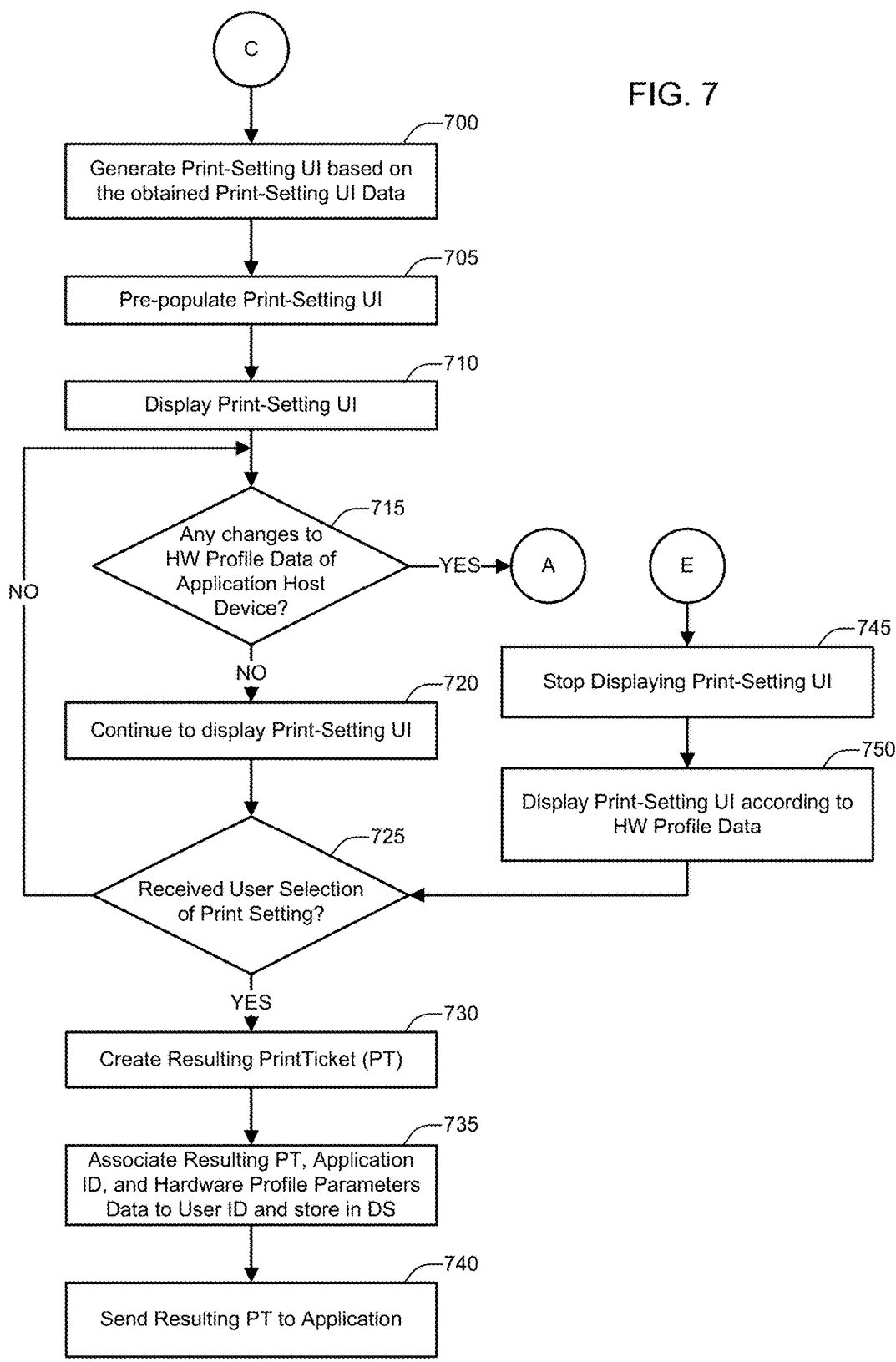
FIG. 7 is a flowchart illustrating an example embodiment of a method for displaying a print-setting UI.

FIG. 7 is a flowchart illustrating an example embodiment of a method for displaying a print-setting UI. When the printer extension application obtains print-setting UI data either from the data store or one or more of the servers in the cloud-based distributed network, the printer extension application displays the print-setting UI via the application-host device.

Beginning in block 700, a print-setting UI is generated based on the obtained print-setting UI data. In block 705, the print-setting UI is pre-populated according to the default print settings in the default PrintTicket that was received from the print subsystem. In some embodiments, the print-setting UI is pre-populated according to the user-selected print-setting options previously stored in the data store. In block 710, the print-setting UI is displayed on the application-host device (e.g., via the I/O device of the application-host device).

In block 715, whether any changes have been made to the application-host device (e.g., the hardware profile data of the application-host device) is determined. The changes may include changes to the input methods, the screen size, the screen resolution, and other capabilities of the application-host device. If one or more changes were made to the application-host device (block 715=YES), then the flow proceeds to "A" in FIG. 5. Otherwise, if no changes were made to the application-host device (block 715=NO), then the flow proceeds to block 720.

In block 720, the print-setting UI continues to be displayed on the application-host device. For example, if no changes were made to the application-host device, then the print-setting UI that is being displayed continues to be displayed on the application-host device.

Then in block 725, whether user selections of print settings options have been received is determined. The user may select print-setting options via the print-setting UI. The user-selections of the print-setting options may be considered to be received when the user indicates the completion of the selection of the print-setting options via the displayed print-setting UI. The user may indicate the completion by clicking, tapping, pressing, swiping, or touching an "OK" or "print" button, an icon, or another control that is displayed within the print-setting UI. If the user selections of print-setting options have been received (block 725=YES), then the flow proceeds to block 730. Otherwise, if the user selections of print-setting options have not been received (block 725=NO), then the flow return to block 715.

In block 730, a resulting PrintTicket is created based on the user selections of print-setting options. For example, the printer extension application generates a delta PrintTicket based on the user-selected print-setting options. Then, the delta PrintTicket is validated and merged with the default PrintTicket to create a resulting PrintTicket. The operations of generating the delta PrintTicket and creating the resulting PrintTicket may be performed via the printer extension library in the printer extension application.

In block 735, the resulting PrintTicket, the application ID, and the hardware profile data are associated with the user token and stored in the data store. Then, in block 740, the resulting PrintTicket is sent to the print dialogue application via the print subsystem. After the print dialogue application receives the resulting PrintTicket, the print dialogue application sends the resulting PrintTicket with the documents to the printing device via the print subsystem.

If one or more changes to the application-host device were detected in block 715, the flow proceeds to "A" of FIG. 5. Then, the printer extension application determines the changes made to the application-host device and obtains the current hardware profile. If the print-setting UI was being displayed when the current hardware profile was obtained from the data store, the flow proceeds to "E" in FIG. 7, and then proceeds to block 745.

In block 745, the displaying of the print-setting UI is stopped. Then, in block 750, a print-setting UI is displayed according to the current hardware profile data obtained in block 550 in FIG. 5. Then, the flow proceeds to block 725.

FIG. 8 is a block diagram illustrating an example embodiment of a system for managing a print-setting UI. The system for managing a print-setting UI in a driverless printing environment will be described hereinafter.

The system includes an application-host device 800, a cloud-based distributed network 850, and a printing device 860. The application-host device 800 operates in a similar manner as the application-host device 100. The application-host device 800 includes an application 810, a print service 820, a print service plug-in 830, and a data store 840. The functionality and features of the application 810 and the data store 840 are similar to those of the print dialogue application 110 and the data store 150 of FIG. 1, respectively. Thus, the descriptions of the application 810 and the data store 840 are omitted.

The print service 820 may be a cloud-based print service. The print service 820 has similar functionalities as the print subsystem 120. Further, the print service plug-in 830 interfaces with the print service 820, the data store 840, and the cloud-based distributed network 850, and has similar functionalities as the printer extension application 160.

In this embodiment of a driverless print system, the print service 820 receives a request to display a print-setting UI from the application 810. The request includes at least the user ID and the application ID. The print service 820 passes the user ID and the application ID to the print service plug-in 830. Then, the print service plug-in 830 obtains hardware profile data of the application-host device 800 by checking the capabilities of the application-host device 800. In some embodiments. In some embodiments, the hardware profile data may be obtained from the operating system of the application-host device 800. The print service plug-in 830 determines whether print-setting UI data, which are associated with the user ID, application ID, hardware profile data, or any combination of the three, are stored in the data store 840. However, if the print service plug-in 830 determines that the print-setting UI data, which are associated with the user ID, application ID, hardware profile data, or any combination of the three, are not stored in the data store 840, then the print service plug-in 830 communicates with an IHV, ISV, or both in the cloud-based distributed network 850 and obtains the print-setting UI data.

The print service plug-in 830 generates the print-setting UI according to the print-setting UI data that were obtained and displays the print-setting UI on the application-host device (e.g., via the I/O device of the application-host device). After the print service plug-in 830 receives user selections of the print-setting options via the print-setting UI, the print service plug-in 830 sends the user-selections of the print-setting options to the print service 820. Then, a PrintTicket document is generated according to the user-selected print-setting options. The print service 820 sends the PrintTicket document to the printing device 860.

Figure 9A:
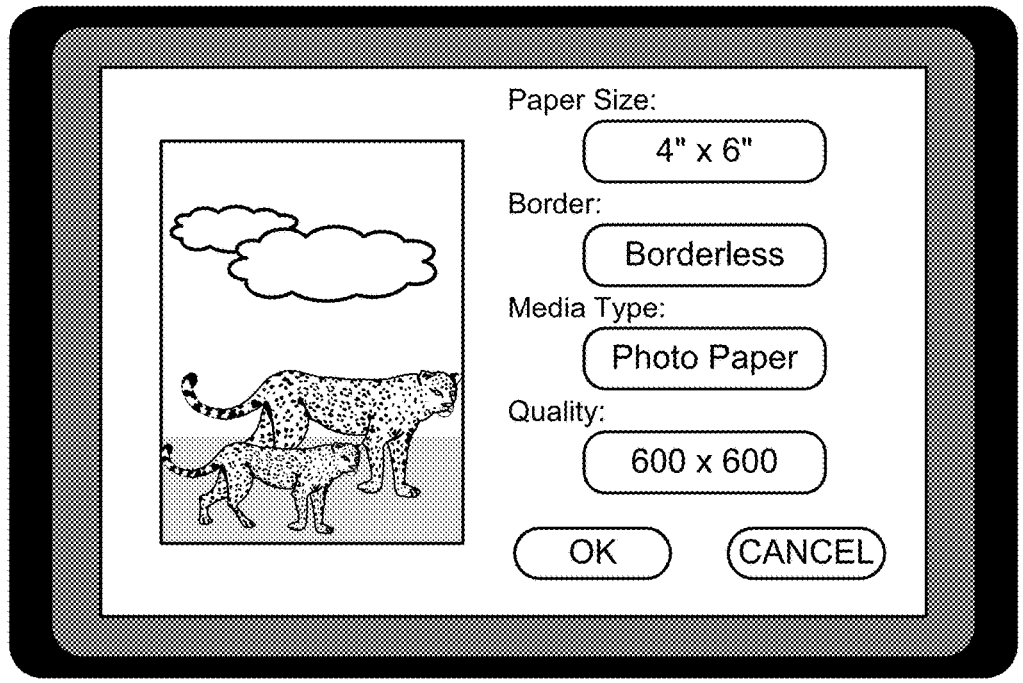
FIG. 9A and FIG. 9B illustrate example embodiments of user interfaces.
Figure 9B:
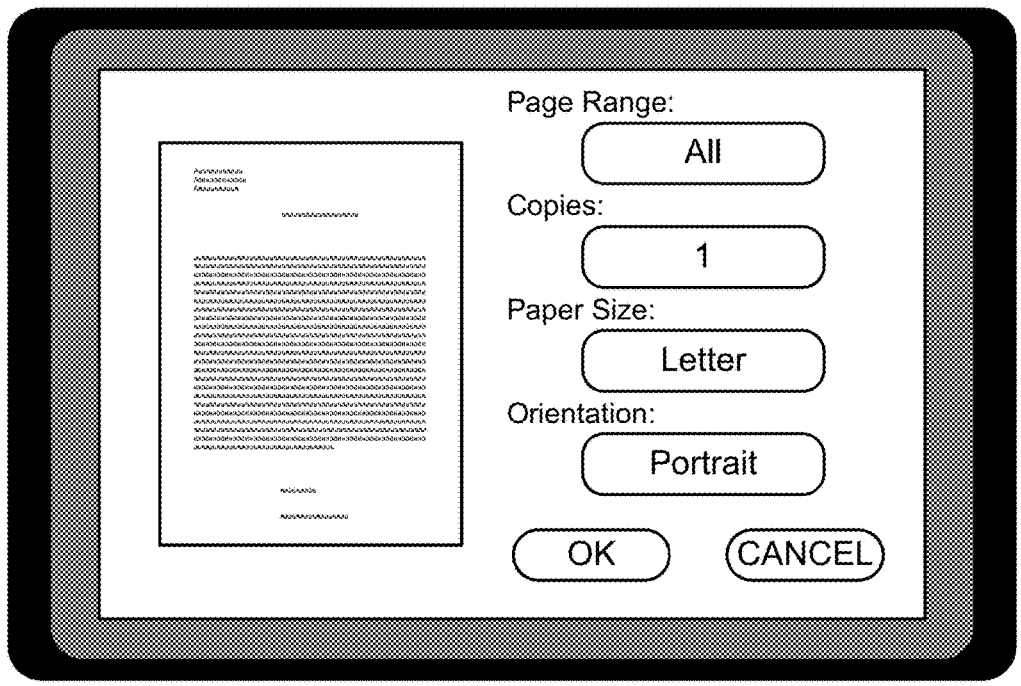

FIG. 9A and FIG. 9B illustrate example embodiments of user interfaces. FIG. 9A illustrates an example embodiment of a print-setting UI for a photo editing application (e.g., the print dialogue application 110) on a tablet device. The print-setting UI is designed so that the user of the tablet device may use a touch-centric input method to easily manipulate the print settings. Additionally, the print-setting UI is designed so that the settings that may be more relevant to photo printing are displayed in the print-setting UI.

FIG. 9B illustrates an example embodiment of a print-setting UI for a text document processing application on a tablet device that uses touch-centric input. The print-setting UI is also designed so that the user of the tablet device may easily manipulate the print settings by means of touch-centric input. Then, the print settings that may be more relevant to the text document printing are displayed in the print-setting UI.

Figure 10A:
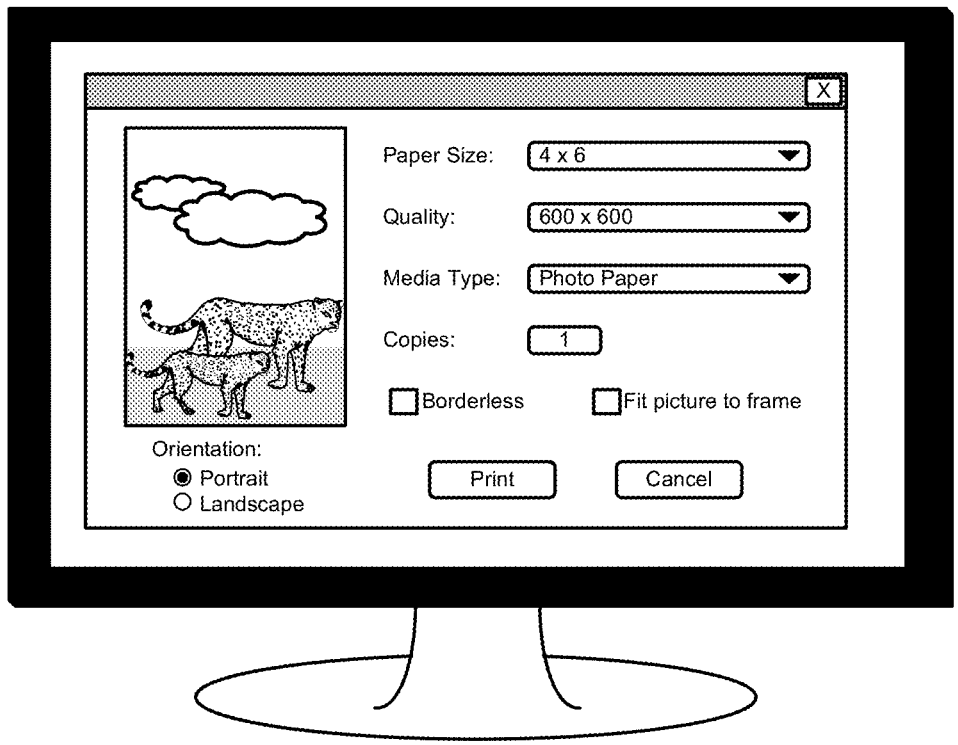
FIG. 10A and FIG. 10B illustrate example embodiments of user interfaces.
Figure 10B:
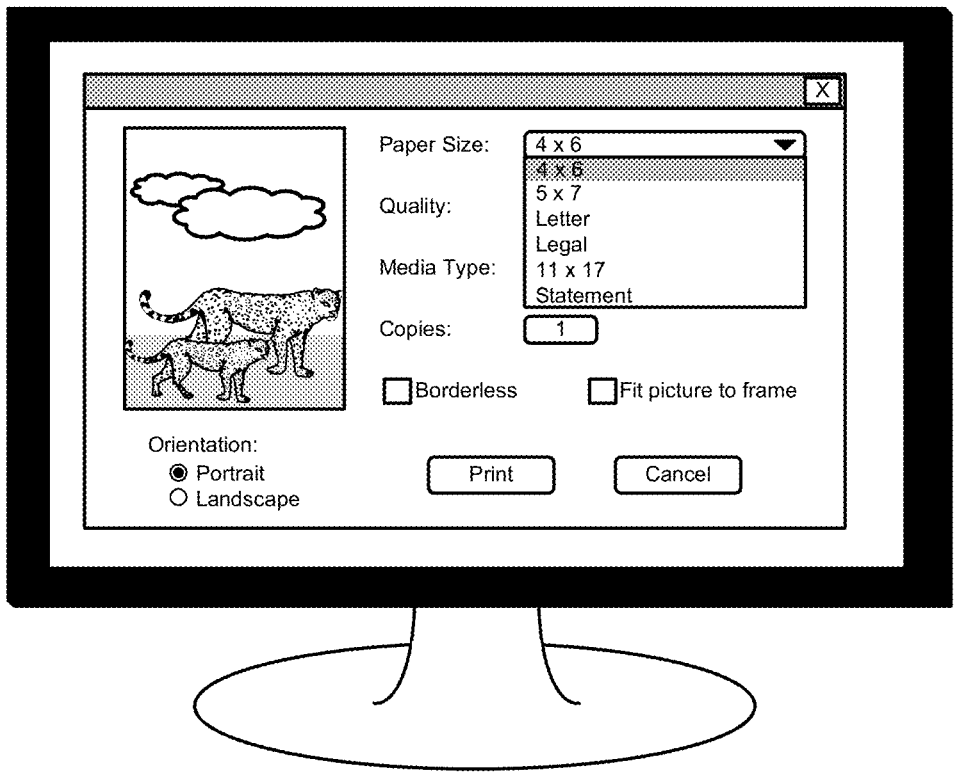

FIG. 10A and FIG. 10B illustrate example embodiments of user interfaces. FIG. 10A shows a print-setting UI for a photo-editing application on a desktop computer that uses a mouse-centric input method. Since the screen size is larger and the input method is mouse centric, the print-setting UI shows more print settings than the print-setting UI of FIG. 9, which is displayed on a tablet device. FIG. 10B shows a print-setting UI for a photo-editing application on a desktop computer that uses a mouse-centric input method in which the user clicks on the paper size options to select a paper size.

Figure 11A:
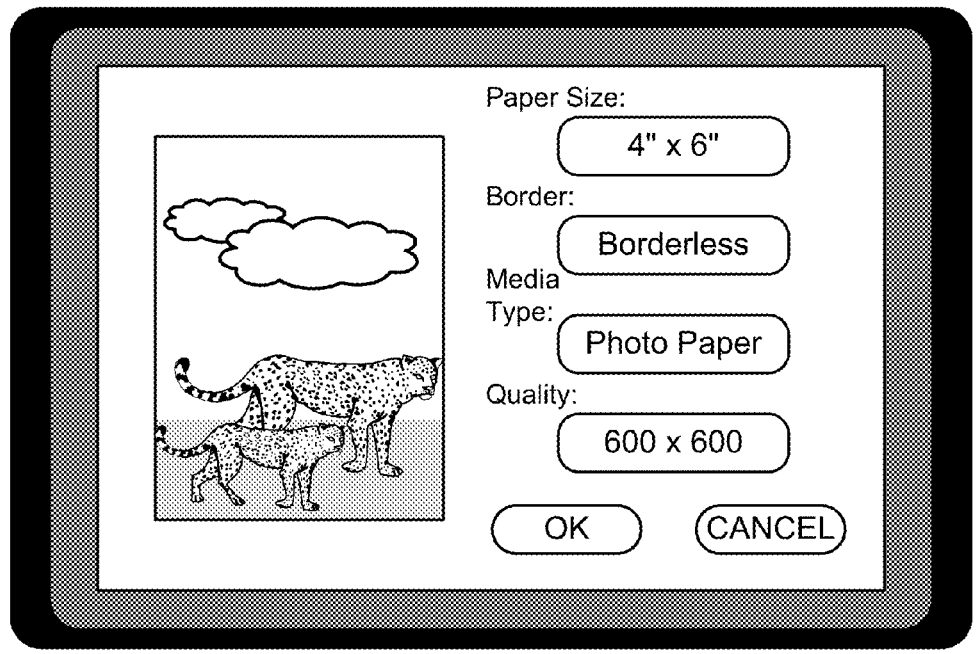
FIG. 11A and FIG. 11B illustrate example embodiments of user interfaces.
Figure 11B:
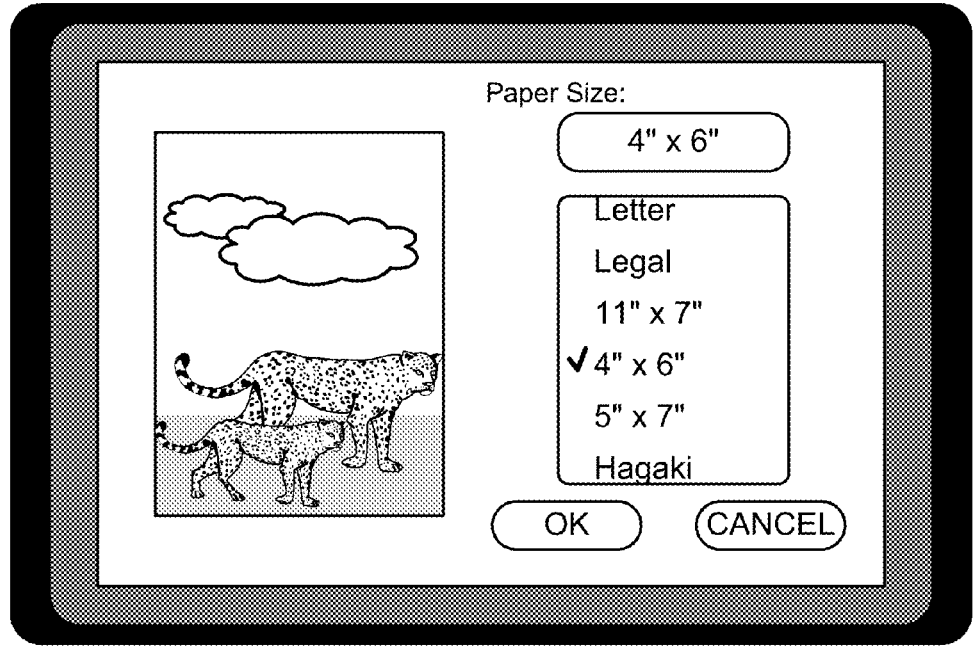

FIG. 11A and FIG. 11B illustrate example embodiments of user interfaces. FIG. 11A shows a print-setting UI for a photo-editing application on a tablet device that uses a touch-centric input method. Since the screen size may be smaller than that of the desktop and since the input method is touch centric, the print-setting UI displays print-setting options in a manner that is easier for the user to see.

When the user wishes to change the paper size, the user may tap or slide a finger over the box that indicates the current paper size. Then, the print-setting UI of FIG. 11A changes to the print-setting UI illustrated in FIG. 11B. The user does not need to scroll down the list of paper sizes, but the user may tap or slide over the desired paper size to change to the desired paper size from the current paper size.

Figure 12C:
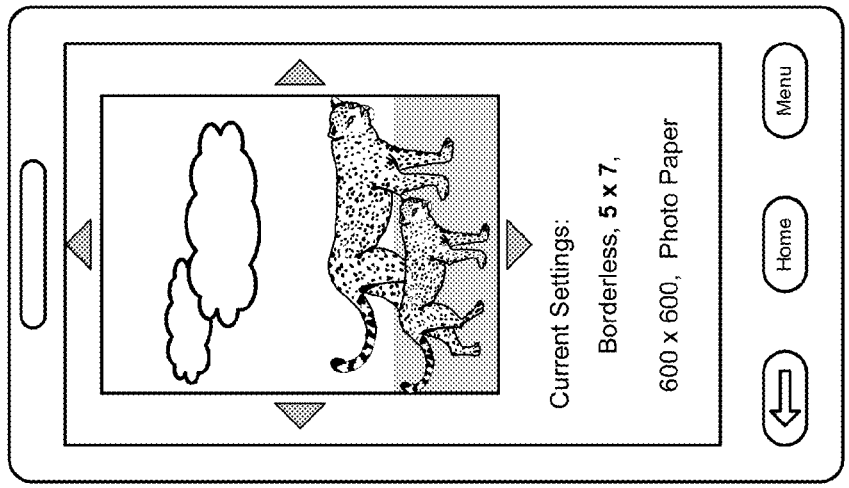
FIG. 12A, FIG. 12B, and FIG. 12C illustrate example embodiments of user interfaces.
Figure 12B:
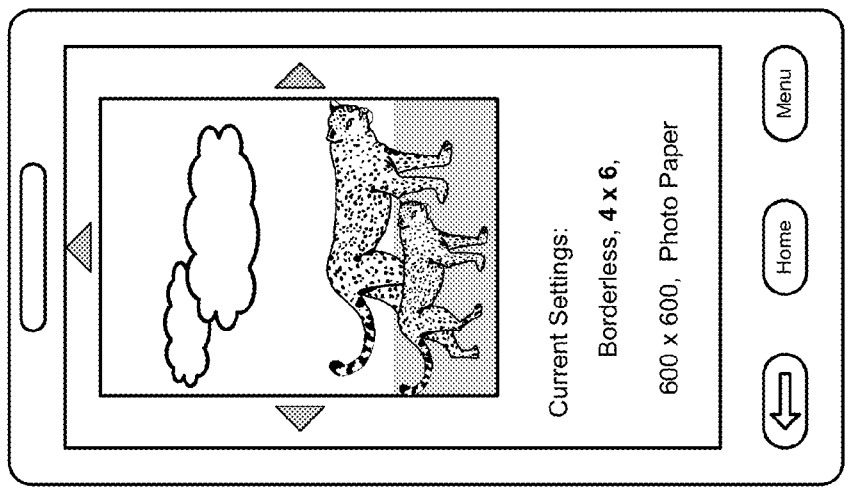
Figure 12A:
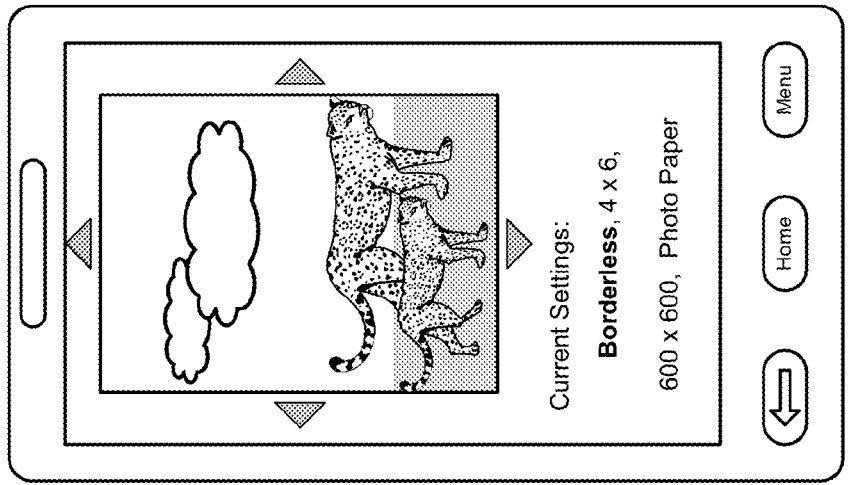

FIG. 12A, FIG. 12B, and FIG. 12C illustrate example embodiments of user interfaces. FIG. 12A shows a print-setting UI for a photo-editing application on a smartphone with a touch-centric input method. For the user to change the print settings, the user may swipe either left or right to choose the print settings and swipe up or down to choose the associated options. For example, if the user wishes to change the paper size in the print-setting UI, the user swipes the image of the photo to left to move to the paper size print setting. Then the current paper size is bolded to indicate that the paper size print setting is selected, as shown in FIG. 12B. To choose a different paper size option, the user may either swipe up or down. Then, the selected paper size option is bolded as shown FIG. 12C. The print settings and the associated options may be highlighted or circled instead of bolded.

Figure 13:
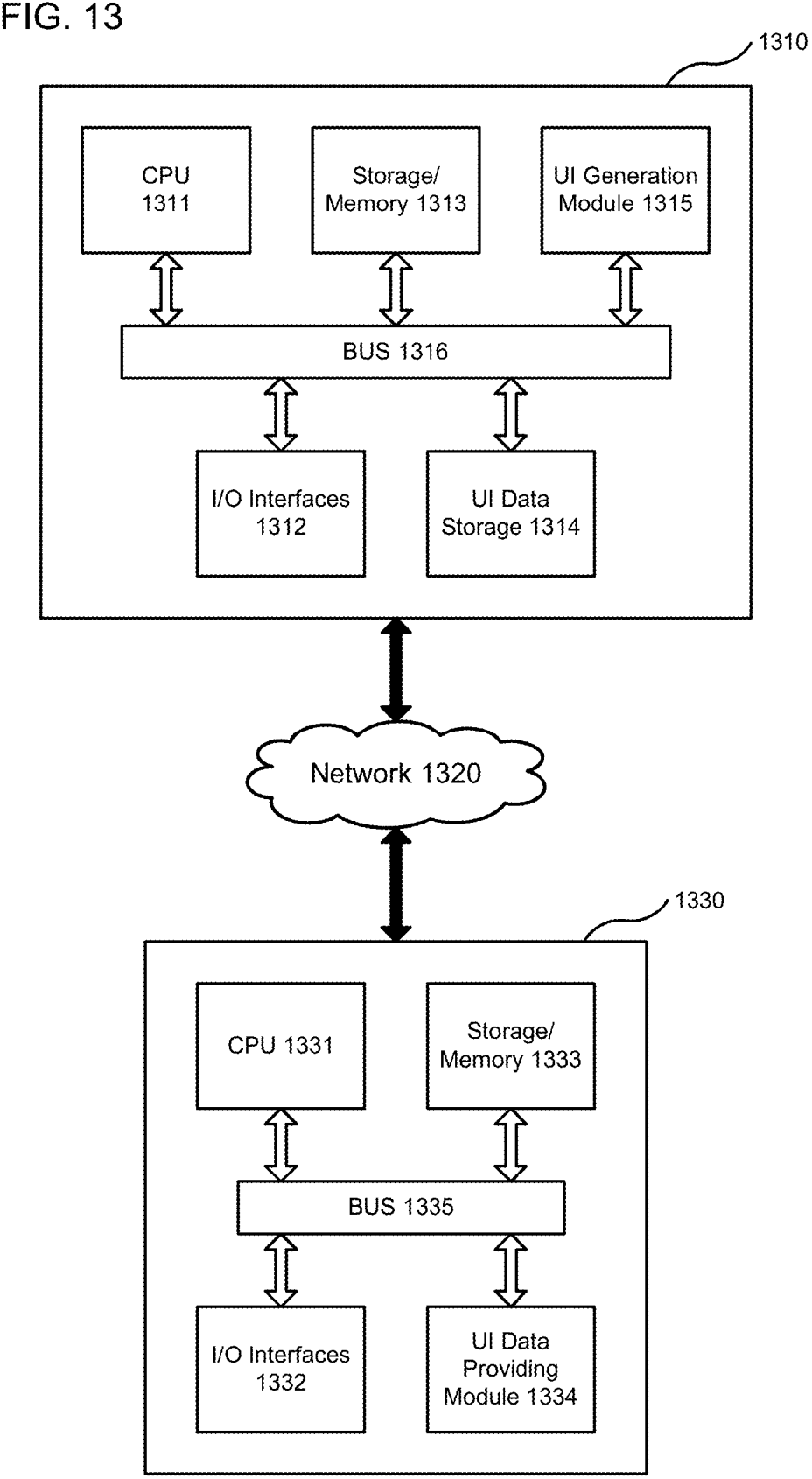
FIG. 13 illustrates an example embodiment of a system for managing a print-setting UI.

FIG. 13 illustrates an example embodiment of a system for managing a print-setting UI. The system for managing a print-setting UI includes an application-host device 1310, a network 1320, and an ISV/IHV server 1330. The application-host device 1310 includes a CPU 1311, I/O interfaces 1312, storage/memory 1313, UI data storage 1314, a UI generation module 1315, and a bus 1316.

The CPU 1311 includes one or more central processing, which may be a conventional or customized microprocessor(s) or other circuits. The CPUs are configured to read and execute computer-readable instructions, such as instructions stored in storage or in memory. The CPUs may command and/or control other components of the application-host device 1300. The I/O interfaces 1312 provide communication interfaces to I/O devices, which may include a keyboard, a display device, a mouse, a printing device, a touch screen, a light pen, an optical storage device, a scanner, a microphone, a camera, a drive, and a wired or wireless network.

The storage/memory 1313 includes one or more computer-readable or computer-writable storage media. A computer-readable storage medium, as opposed to mere transitory, propagating signals, is a tangible article of manufacture, for example, a magnetic disk (e.g., a hard drive, a floppy disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 1313 stores computer-readable data or computer-executable instructions.

The UI data storage 1314 includes one or more computer-readable storage media that are configured to store data related to a print-setting UI, such as print-setting UI data, user-selected options, user IDs, and print dialogue application IDs. The UI-generation module contains instructions that, when executed, or circuits that, when activated, cause the host-application device 1310 to obtain print-setting UI data and generate a print-setting UI based on the obtained print-setting UI data. The components of the host-application device 1310 communicate via the bus 1316.

The ISV/IHV server 1330 includes a CPU 1331, I/O interfaces 1332, a storage/memory 1333, a UI data providing module 1334, and a bus 1335. The UI data providing module 1334 contain instructions that, when executed, or circuits that, when activated, cause the ISV/IHV server 1330 to provide print-setting UI data to the host-application device 1310. The components of the ISV/IHV server 1330 communicate via the bus 1335. The host-application device 1310 and the ISV/IHV server 1330 communicate via the network 1320.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

While the above disclosure describes certain illustrative embodiments, the invention is not limited to the above-described embodiments, and the following claims include various modifications and equivalent arrangements within their scope.

What is claimed is:

1. A method for managing a print-setting user interface, the method comprising:
    receiving a request to display a print-setting user interface (UI) from an application, wherein the request includes at least an application identification (ID) of the application;
    obtaining first hardware profile data of an application-host device, wherein the application-host device has the application installed thereon;
    displaying a first print-setting UI for a first display size based on first print-setting UI data conforming to the application ID and the first hardware profile data indicating that a display size is a first size;
    determining whether one or more changes are made to the first hardware profile data:
    responsive to determining that the one or more changes are made to the first hardware profile data, obtaining second hardware profile data, which encompasses the one or more changes made to the first hardware profile data and indicates that the display size is a second size different from the first size;
    determining whether the first print-setting UI data conforms to the second hardware profile data;
    responsive to determining that the first print-setting UI data conforms to the second hardware profile data, continuing to display the first print-setting UI according to the first print-setting UI data; and
    responsive to determining that the first print-setting UI data does not conform to the second hardware profile data,
        obtaining second print-setting UI data, which conforms to the application ID and the second hardware profile data,
        generating a second print-setting UI for a second display size according to the second print-setting UI data, and
        displaying the second print-setting UI for the second display size based on the second print-setting UI data,
        wherein a print setting item included in the first print-setting UI is different from a print setting item included in the second print-setting UI.

2. The method according to claim 1, wherein the first print-setting UI is prepopulated.

3. The method according to claim 1, further comprising:
    receiving a user selection of one or more print settings via the first print-setting UI;

associating the one or more user-selected print settings with the first print-setting UI data that conforms to the first hardware profile data; and storing the first print-setting UI data that conforms to the first hardware profile data and that is associated with one or more user-selected print settings in a data store.

4. The method according to claim 1, wherein obtaining the first print-setting UI data includes determining whether the first print-setting UI data is stored in a data store; and responsive to determining that the first print-setting UI data is not stored in the data store, retrieving the first print-setting UI data conforming to the application ID from one or more remote computing devices by passing the application ID.

5. The method according to claim 4, further comprising, in response to determining that the first print-setting UI data is stored in the data store, retrieving the first print-setting UI data from the data store.

6. The method according to claim 4, wherein the one or more remote computing devices are servers.

7. The method according to Claim 1, wherein obtaining the second print-setting UI data includes determining whether the second print-setting UI data is stored in a data store;

responsive to determining that the second print-setting UI data is not stored in the data store, retrieving the second print-setting UI data from one or more remote computing devices by passing the application ID and the second hardware profile data; and responsive to determining that the second print-setting UI data is stored in the data store, retrieving the second print-setting UI data from the data store.

8. A computing device comprising:

one or more computer-readable media; and one or more processors that are in communication with the computer-readable media and that are configured to cause the computing device to perform operations including receiving a request to display a print-setting user interface (UI) from an application, wherein the request includes at least an application identification (ID) of the application;

obtaining first hardware profile data of the computing device, wherein the computing device has the application installed thereon, and wherein the first hardware profile data indicates that a display size is a first size;

determining whether first print-setting UI data conforms to the first hardware profile data;

displaying a first print-setting UI for a first display size based on the first print-setting UI data conforming to the application ID and the first hardware profile data that indicates that the display size is the first size;

determining whether one or more changes are made to the first hardware profile data;

responsive to determining that the one or more changes are made to the first hardware profile data, obtaining second hardware profile data, which encompasses the one or more changes made to the first hardware profile data and which indicates that the display size is a second size different from the first size:

determining whether the first print-setting UI data conforms to the second hardware profile data;

responsive to determining that the first print-setting UI data conforms to the second hardware profile data, continuing to display the first print-setting UI according to the first print-setting UI data, which conforms to the second hardware profile data; and responsive to determining that the first print-setting UI data does not conform to the second hardware profile data, obtaining second print-setting UI data, which conforms to the application ID and the second hardware profile data, generating a second print-setting UI for a second display size according to the second print-setting UI data, and displaying the second print-setting UI for the second display size, wherein a print setting item included in the first print-setting UI is different from a print setting item included in the second print-setting UI.

9. The computing device of claim 8, wherein the one or more processors are further configured to cause the computing device to perform operations including:

receiving a user selection of one or more print settings via the first print-setting UI;

associating the one or more user-selected print settings with the first print-setting UI data that conforms to the first hardware profile data; and storing the first print-setting UI data that conforms to the first hardware profile data and that is associated with the one or more user-selected print settings in a data store.

10. The computing device of claim 8, wherein the one or more processors are further configured to cause the computing device to obtain the first print-setting UI data, wherein obtaining the first print-setting UI data includes determining whether the first print-setting UI data is stored in a data store;

responsive to determining that the first print-setting UI data is not stored in the data store, retrieving the first print-setting UI data conforming to the application ID from one or more remote computing devices by passing the application ID; and responsive to determining that the first print-setting UI data is stored in the data store, retrieving the first print-setting UI data from the data store.

11. The computing device of Claim 8, wherein the one or more processors are further configured to cause the computing device to obtain the second print-setting UI data, and wherein obtaining the second print-setting UI data includes determining whether the second print-setting UI data is stored in a data store;

responsive to determining that the second print-setting UI data is not stored in the data store, retrieving the second print-setting UI data from one or more remote computing devices by passing the application ID and the second hardware profile data; and responsive to determining that the second print-setting UI data is stored in the data store, retrieving the second print-setting UI data from the data store.

12. One or more non-transitory computer-readable media storing instructions that, when executed by one or more computing devices, cause the one or more computing devices to perform operations comprising:

receiving a request to display a print-setting user interface (UI) from an application, wherein the request includes at least an application identification (ID) of the application;

obtaining first hardware profile data of an application-host device, wherein the application-host device has the application installed thereon;

determining whether first print-setting UI data conforms to the first hardware profile data;

displaying a first print-setting UI for a first display size based on first print-setting UI data conforming to the application ID and the first hardware profile data indicating that a display size is a first size;

determining whether one or more changes are made to the first hardware profile data;

responsive to determining that the one or more changes are made to the first hardware profile data, obtaining second hardware profile data, which encompasses the one or more changes made to the first hardware profile data and indicates that the display size is a second size different from the first size;

determining whether the first print-setting UI data conforms to the second hardware profile data;

responsive to determining that the first print-setting UI data conforms to the second hardware profile data, continuing to display the first print-setting UI according to the first print-setting UI data; and responsive to determining that the first print-setting UI data does not conform to the second hardware profile data, obtaining second print-setting UI data, which conforms to the application ID and the second hardware profile data, generating a second print-setting UI for a second display size based on the second print-setting UI data, and displaying the second print-setting UI, wherein a print setting item included in the first print-setting UI is different from a print setting item included in the second print-setting UI.

13. The one or more non-transitory computer-readable media of claim 12, wherein the operations further comprise:

receiving a user selection of one or more print settings via the first print-setting UI;

associating the one or more user-selected print settings with the first print-setting UI data that conforms to the first hardware profile data; and storing the first print-setting UI data that conforms to the first hardware profile data and that is associated with the one or more user-selected print settings in a data store.

14. The one or more non-transitory computer-readable media of claim 12, wherein the operations further comprise obtaining the first print-setting UI data, and wherein obtaining the first print-setting UI data includes determining whether the first print-setting UI data is stored in a data store;

responsive to determining that the first print-setting UI data is not stored in the data store, retrieving the first print-setting UI data conforming to the application ID from one or more remote computing devices by passing the application ID; and responsive to determining that the first print-setting UI data is stored in the data store, retrieving the first print-setting UI data from the data store.

15. The one or more non-transitory computer-readable media of Claim 12, wherein obtaining the second print-setting UI data includes determining whether the second print-setting UI data is stored in a data store;

responsive to determining that the second print-setting UI data is not stored in the data store, retrieving the second print-setting UI data from one or more remote computing devices by passing the application ID and the second hardware profile data; and responsive to determining that the second print-setting UI data is stored in the data store, retrieving the second print-setting UI data from the data store.

* * * * *